United States Patent [19]

Turak

[11] 4,223,765
[45] Sep. 23, 1980

[54] DRUM BRAKE HAVING PAWL AND LEVER

[75] Inventor: John L. Turak, South Bend, Ind.

[73] Assignee: The Bendix Corporation, Southfield, Mich.

[21] Appl. No.: 946,482

[22] Filed: Sep. 28, 1978

[51] Int. Cl.³ .......................................... F16D 65/38
[52] U.S. Cl. ...................... 188/79.5 P; 188/79.5 GT; 188/196 BA; 188/327
[58] Field of Search .................. 188/79.5 P, 79.5 GT, 188/196 BA, 327–330, 196 B

[56] References Cited
U.S. PATENT DOCUMENTS

| | | | |
|---|---|---|---|
| 2,822,893 | 2/1958 | Flueler | 188/196 B |
| 3,460,653 | 8/1969 | Wieger | 188/196 BA X |
| 3,717,227 | 2/1973 | Rath | 188/79.5 P |
| 3,963,100 | 6/1976 | Kaub | 188/79.5 P |
| 4,101,011 | 7/1978 | Burnett | 188/79.5 GT |

*Primary Examiner*—Douglas C. Butler
*Attorney, Agent, or Firm*—Paul D. Schoenle; Ken C. Decker

[57] ABSTRACT

A drum brake includes a backing plate with an anchor for pivotally engaging one end of a pair of brake shoes. A hydraulic actuator is engageable with the other end of the pair of brake shoes and is operable to move the pair of brake shoes from a rest position to a braking position. An extendible strut extends between the pair of brake shoes to limit the retraction of the pair of brake shoes upon termination of a braking application. A lever is pivitally coupled to one of the brake shoes and a pawl is pivotally coupled to the other brake shoe. The pawl and lever are releasably interlocked with their respective brake shoes via hooks which are received in slanted slots or openings. A resilient member cooperates with the pawl to retain the latter in engagement with the extendible member and also cooperates with the pair of brake shoes to urge the same into engagement with the hydraulic actuator. The extendible member engages the pair of brake shoes at an intermediate portion and the pivotal coupling between thelever and one brake shoe and the pawl and other brake shoe is disposed at a location between the intermediate portion and the other end of each brake shoe.

7 Claims, 5 Drawing Figures

DRUM BRAKE HAVING PAWL AND LEVER

BACKGROUND OF THE INVENTION

In a drum brake assembly a parking lever is pivotally secured to one brake shoe and a pawl pivotally secured to another brake shoe so that the lever and pawl cooperate with an extendible member to, respectively, provide a parking brake application and adjust for wear of the pair of brake shoes.

In response to the demand for fuel economy, automobile manufacturers are forced to reduce the size of most vehicles so that compact brake assemblies are necessary to fit within the available space. Moreover, as increasing manufacturing and repair costs deter commercial success it is necessary for a brake assembly to be easily assembled and disassembled in as little time as possible.

SUMMARY OF THE INVENTION

The present drum brake assembly provides a pair of brake shoes which are reversible so that one brake shoe can be used for the other and vice versa. The pair of brake shoes define inclined slots or openings and a pawl and lever define hooks to releasably lock the lever with one brake shoe and the pawl with another brake shoe of a set via the slots. The pawl and lever releasably lock with the pair of brake shoes at a location above a horizontal line defined by an extendible member extending between the pair of brake shoes. The extendible strut cooperates with the pawl to retain the same in a plane substantially parallel to the plane of the pair of brake shoes as defined by webs on the brake shoes.

It is an object of the present invention to compactly arrange a pawl which cooperates with an extendible member at one end of a pair of brake shoes.

It is another object to provide a releasable attachment between each brake shoe and its corresponding pawl and parking lever so as to provide for simple assembly and disassembly of the drum brake assembly.

DETAILED DESCRIPTION

Figure 1:
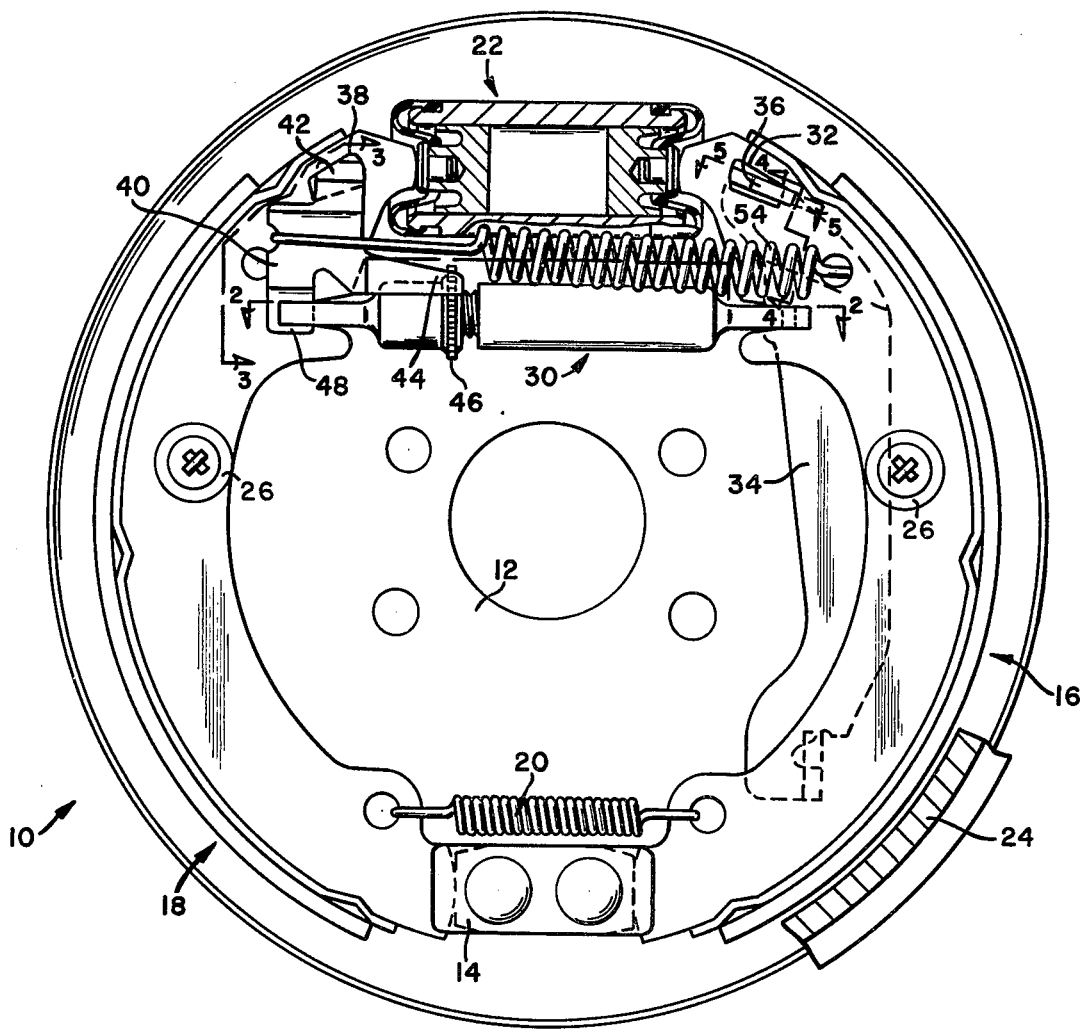
FIG. 1 is a side view of a drum brake assembly constructed in accordance with the present invention.

In FIG. 1 a drum brake assembly, generally referred to as 10, includes a backing plate 12 with an anchor 14. The anchor pivotally supports a pair of brake shoes 16 and 18 and a spring 20 retains the one end of each brake shoe in engagement with the anchor 14. The other end of each brake shoe is engageable with a hydraulic actuator 22, such as a wheel cylinder, and the latter is operable to move the pair of brake shoes 16 and 18 from a rest position, as shown, to a braking position in engagement with a rotatable drum 24. Hold down devices at 26 retain the pair of brake shoes in juxtaposition to the backing plate 12.

A strut or extendible member 30 extends between the pair of brake shoes 16 and 18 and is engageable with the latter at an intermediate portion between the one and other ends. The extendible member 30 also substantially defines a horizontal line.

The brake shoe 16 forms a slot or opening 32 which in inclined in a clockwise direction relative to the horizontal line. An operator lever 34 includes a hook 36 at one end and the hook is inserted within the slot 32 to releasably lock the lever 34 to the one brake shoe 16. In a similar manner the brake shoe 18 forms a slot or opening 38 which is inclined in a counter clockwise direction relative to the horizontal line. An adjustment pawl 40 includes a hook 42 which is inserted within the slot 38 to releasably lock the pawl to the other brake shoe 18.

The slots 32 and 38 are formed in the brake shoes 16 and 18, respectively, at locations between the intermediate portions engageable with the hydraulic actuator. As a result the lever and pawl are compactly disposed adjacent the other end of the pair of brake shoes near the hydraulic actuator 22. In addition, the slots are identical so that the brake shoe 16 can be used for the brake shoe 18. Consequently, one brake shoe structure will enable the assembly of a drum brake assembly 10 having a pair of brake shos 16 and 18.

Figure 2:
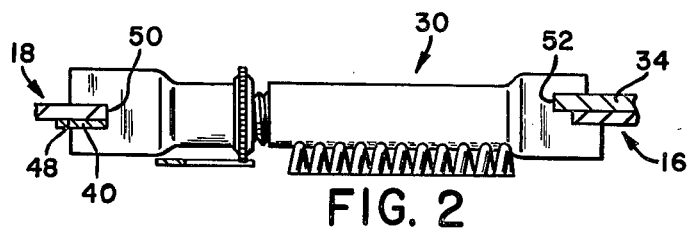
FIG. 2 is a section view taken along line 2—2 of FIG. 1.
Figure 3:
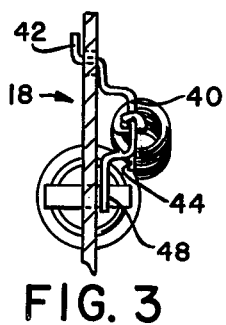
FIG. 3 is a right side view of the pawl taken along line 3—3 of FIG. 1.
Figure 4:
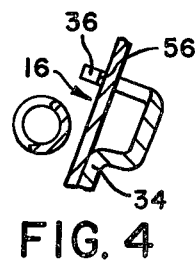
FIG. 4 is a partial view of the lever taken along 4—4 of FIG. 1.
Figure 5:
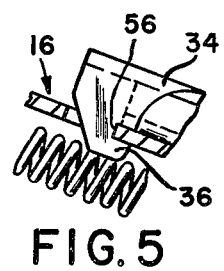
FIG. 5 is a partial view of the lever taken along 5—5 of FIG. 1.

The pawl 40 includes a first arm 44 which is engageable with a ratchet wheel 46 on the extendible member 30 and a second arm 48 which extends into a groove 50 on the extendible member. The groove 50 also receives the other brake shoe 18 while an opposite groove 52 on the extendible member receives the one brake shoe 16 and the lever 34. Viewing FIG. 2, the pawl 40 is disposed on the front side of brake shoe 18 while the lever 34 is disposed on the back side of brake shoe 16. A single resilient member 54 is engageable with the pawl 40 and the one brake shoe 16 to retain the second arm 48 within the groove 50 in abutment with the extendible member 30 and also to retain the first arm 44 in engagement with the ratchet wheel 46. Moreover, the resilient member 54 biases the pair of brake shos into engagement with the hydraulic actuator 22.

In order to releasably attach the pawl 40 to the brake shoe 18, the pawl 40 is disposed substantially perpendicular to the brake shoe 18 so that the hook 42 can be inserted into the slot 38. Thereafter the pawl 40 is rotated in a plane perpendicular to the brake shoe 18, to parallel the brake shoe 18 and the arm 48 is inserted into the groove 50 so that the extendible member cooperates with the arm 48 to releasably lock the pawl 40 to the brake shoe 18.

The lever 34 includes a recess 56 to substantially define the hook 36. In order to attach the lever 34 to the brake shoe 16, the hook 36 is inserted into the slot 32 such that the brake shoe is received within the recess 56 and the lever is received within the slot 52.

During a braking application, the hydraulic actuator 22 is operable to move the pair of brake shoes into frictional engagement with the drum 24. The resilient member 54 cooperates with the pawl 40 to impart a force to the extendible member causing the same to move with the brake shoe 16 and the brake shoe 18 is movable within the groove 50 during braking, while the pawl 40 also pivots counterclockwise about the abutment with the extendible member 30. If the movement of the pair of brake shoes is in excess of a predetermined clearance between the brake shoes and drum 24, the pivoting of the pawl about the edge of groove 50 causes the arm 44 to index to another tooth on the resilient wheel 46. Thereafter, upon termination of braking, the resilient member 54 pivots the pawl clockwise so that the pivoting arm 44 rotates the ratchet wheel 46 to extend the extendible manner. As the extendible member opposes retraction of the pair of brake shoes, this extension adjusts the clearance between the pair of brake shoes and the drum 24 as well known in the art.

When the drum brake assembly 10 is assembled, two identical brake shoes are juxtapositioned facing each other so that the pawl, lever, extendible member and resilient member can be attached thereto. As the pawl and lever are releasably locked to their respective brake shoes, it is possible to perform the assembly of the drum brake assembly 10 without extra parts such as rivets or pins. Moreover, the drum brake assembly 10 can be easily and quickly disassembled as the pawl, lever and extendible member are free to separate from the brake shoes once the resilient member is removed. As a result the single step of removing the resilient member 54 substantially frees all the parts of the drum brake assembly for disassembly.

I claim:

1. In a drum brake assembly having a backing plate which pivotally supports a pair of brake shoes at one end of the pair of brake shoes, a hydraulic actuator engageable with the other end of the pair of brake shoes to move the same from a rest position to a braking position, an extendible member engageable with the pair of brake shoes at an intermediate position between the one end and the other end and cooperating therewith to substantially define the rest position, an operator lever pivotally carried by one of the pair of brake shoes, the operator lever being pivotal relative to the one brake shoe to cooperate with the extendible member and move the pair of brake shoes to the braking position, a pawl pivotally carried by the other brake shoe and cooperating with the extendible member to adjust the rest position of the pair of brake shoes when the distance between the rest position and the braking position is above a predetermined dimension, the improvement wherein the pair of brake shoes are reversible so that the one brake shoe can be used in place of the other brake shoe, the pair of brake shoes including openings which are located between the intermediate portion and the other end, said opening on the one brake shoe cooperating with the operator lever to pivotally mount the same relative to the one brake shoe and said opening on the other brake shoe cooperating with the pawl to pivotally mount the same relative to the other brake shoe, and said openings being mirror images of each other.

2. The drum brake assembly of claim 1 in which the operator lever and the pawl include hooks which are received, respectively, in said one brake shoe opening and said other brake shoe opening and said hooks cooperate with the respective brake shoes to releasably lock the operator lever and the pawl thereto.

3. In a drum brake assembly having a backing plate which pivotally supports a pair of brake shoes at one end of each brake shoe, a hydraulic actuator cooperating with the other end of each brake shoe to move the latter to a braking position, a lever pivotally coupled to one brake shoe, an extendible member cooperating with the other brake shoe and the lever to urge the pair of brake shoes to the braking position upon pivotal movement of the lever, a pawl pivotally coupled to the other brake shoe and a resilient member urging the pair of brake shoes into engagement with the hydraulic actuator and cooperating with the pawl to urge the latter into engagement with the extendible member, and cooperating with the extendible member to extend the latter, the improvement wherein the extendible member is engageable with an intermediate portion of each brake shoe between the one and other ends, the lever being pivotally coupled to the one brake shoe at a location between the intermediate portion and its other end and the pawl being pivotally coupled to the other brake shoe at a location between the intermediate portion and its other end, the other brake shoe defining a slot between the intermediate portion and its other end, and the pawl defining a hook extending into the slot, the hook pivotally anchoring the pawl to the other brake shoe at the slot.

4. In a drum brake assembly having a pair of brake shoes which are movable to a brake position by a hydraulic actuator, an extendible member extending between the pair of brake shoes and cooperating therewith to limit the retraction of the pair of brake shoes upon termination of braking, a lever pivotally coupled to one of the pair of brake shoes and a pawl pivotally coupled to the other brake shoe, the improvement wherein the lever and the pawl each include hooks for releasably locking with their respective brake shoes, the other brake shoe including a slot for receiving the pawl, the pawl being inserted within said slot when the pawl is substantially parallel to the other brake shoe so as to releasably lock therewith.

5. The drum brake assembly of claim 4 in which the extendible member cooperates with the pawl to prevent rotation of the same in a plane perpendicular to the other brake shoe.

6. In a drum brake assembly having a pair of brake shoes which are movable to a brake position by a hydraulic actuator, an extendible member extending between the pair of brake shoes and cooperating therewith to limit the retraction of the pair of brake shoes upon termination of braking, a lever pivotally coupled to one of the pair of brake shoes and a pawl pivotally coupled to the other brake shoe, the improvement wherein the lever and the pawl each include hooks for releasably locking with their respective brake shoes, the other brake shoe including a slot for receiving the pawl, the pawl being inserted within said slot when the pawl is substantially perpendicular to the other brake shoe, the pawl being rotated to substantially parallel the other brake shoe so as to releasably lock therewith, and the extendible member substantially defining a horizontal line and said slot on the other brake shoe being inclined at an angle relative to the horizontal line.

7. The drum brake assembly of claim 6 in which the one brake shoe includes a slot for releasably receiving the lever and said slot on the one brake shoe is also inclined at an angle relative to the horizontal line.

* * * * *